Aug. 16, 1932. H. D. GEYER 1,871,982
APPARATUS AND METHOD FOR MOLDING COMPOSITE STRUCTURES
Filed May 18, 1928 2 Sheets-Sheet 1

Inventor
Harvey D. Geyer
By Spencer Hardman & Fehr
his Attorneys

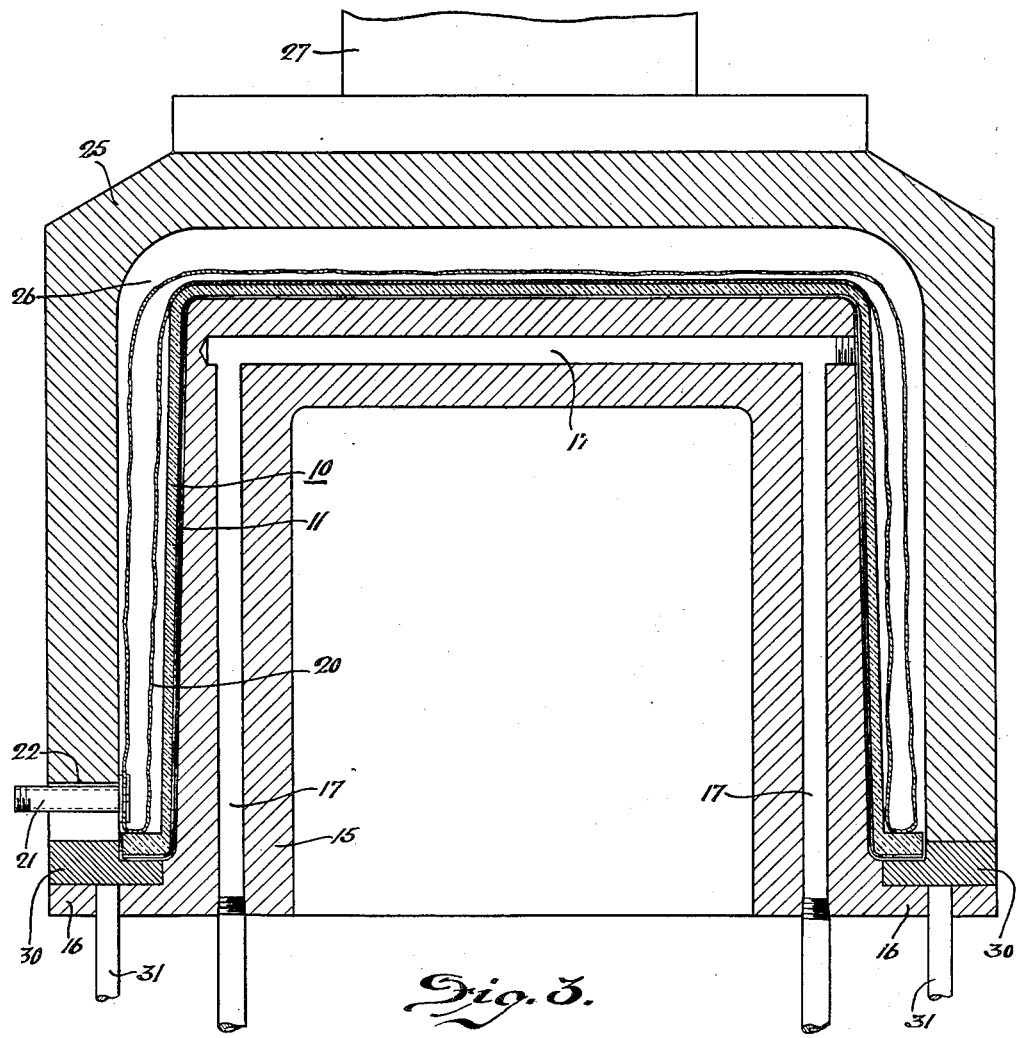

Patented Aug. 16, 1932

1,871,982

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

APPARATUS AND METHOD FOR MOLDING COMPOSITE STRUCTURES

Application filed May 18, 1928. Serial No. 278,900.

This invention relates to a method of and apparatus for molding box-shaped structures having one open side and is especially adapted for molding refrigerator cabinet linings from one moldable material and having a finish coating molded thereupon from another moldable material.

An object of this invention is to provide an efficient and economical method of molding a box-shaped structure having at least one open side from one moldable material and molding under heat and pressure and bonding thereto a finish coating from another moldable material.

A more specific object is to provide a method wherein the box-shaped structure is first pre-molded approximately to shape from a relatively strong material, is then coated with an uncured adhering finish coating of another material which is moldable under heat and pressure, and then the composite structure is finally molded to exact size and shape under heat and pressure whereby the finish coating is molded in place and bonded to the relatively strong material.

Another object is to provide simple and efficient apparatus for performing the above objects.

Further objects and advantages of the present invention will be apparent from the following description, reference being had to the accompanying drawings, wherein a preferred form of embodiment of the present invention is clearly shown.

In the drawings:

Fig. 3 is a transverse section thru a molding apparatus for molding the cabinet lining of Figs. 1 and 2 according to the method of this invention. The premolded and coated cabinet lining is shown in place within the mold and the parts in position for the pressure inflation of the air bag to carry out the final molding operation.

Similar reference characters refer to similar parts.

Figure 1:
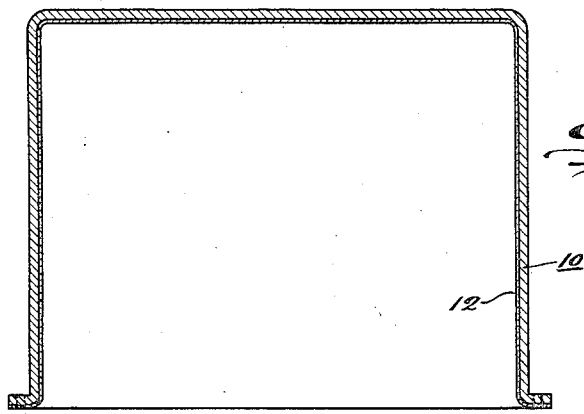
Fig. 1 is a horizontal section, taken on line 1—1 of Fig. 2, of a refrigerator cabinet lining made according to this invention.

In carrying out the method of this invention, the main body 10 of the cabinet lining is first premolded approximately to shape and size, but slightly larger than the desired final dimensions, from a suitable hot plastic fiber-containing bituminous compound which sets and hardens when molded under high hydraulic pressure. Such moldable bituminous compounds are now well known in the arts as exemplified by United States patent to Germain No. 1,610,765, issued December 14, 1926. Preferably, however, this main body 10 is premolded in a suitable mold from a hot bituminous compound according to the disclosure in my co-pending application Serial No. 169,669, filed February 19, 1927.

This premolded bituminous body 10, made as above described, is then coated over its entire interior surface with any suitable uncured adhering moldable material 11 which will flow and harden and form a relatively hard, smooth finish coating 12 upon the bituminous body 10 when it is molded under heat and pressure. The surfacing material used with this invention is preferably a moldable nitrocellulose compound made into an adhesive or paste form by a suitable solvent. When it is subjected to a pressure of around 300 pounds per square inch at a temperature of around 260° F. such moldable nitrocellulose compound becomes plastic and will flow to fill the mold cavity. After several minutes it can be removed from the mold, preferably after the mold has been cooled somewhat, and it will be found to have set and hardened to form a molded article having a well-appearing, hard, smooth surface which requires no polishing or further finishing. In my copending application Serial No. 274,052 filed April 30, 1928, there is disclosed and claimed a composite molded panel having its main body molded from a fibrous bituminous composition and a decorative coating molded thereupon under heat and pressure from this nitrocellulose material called Dumold. This present application involves the apparatus and method of molding a box-shaped article from the same or similar materials described in said above mentioned application.

The uncured finish coating 11 may be applied to the interior surface of the premolded bituminous body 10 in any suitable manner, such as, for example, by means of an air brush. This coated body 10 is then set loosely over the mold core member 15 which is made slightly smaller than the interior dimensions of the body 10, as clearly shown in Fig. 3. It will thus be seen that the body 10 can be telescoped upon the mold core 15 without scraping off the unhardened finish coating thereupon. The inflatable flexible air bag 20, built to roughly correspond to the exterior dimensions of body 10, is then laid loosely over the body 10 and the heavy mold cover 25 lowered in place to enclose the air bag 20 in the closed compartment 26 lying between the mold cover 25 and the mold core member 15, all as clearly illustrated in Fig. 3. The mold cover 25 is held forced down in its closing position shown in Fig. 3 by a suitable hydraulic ram 27. The mold cover 25 may also be suitably attached to the hydraulic ram 27 for conveniently raising and lowering said cover 25 when desired. The air bag 20 has a stem 21 projecting thru a narrow slot 22 provided therefor at the bottom of cover 25, the bottom edge of mold cover 25 being forced down by ram 27 into tight contact with the knockout plate 30 which extends completely around the periphery of mold core 15 and rests upon the flange 16 integral with or fixed to core 15.

The air bag 20 is next inflated with compressed air thru the stem 21 to a pressure of around 300 pounds per square inch. The flexible air bag 20 is backed up by the mold cover 25 in an obvious manner and hence all the exterior surfaces of the bituminous body 10 is subjected to an even pressure of 300 pounds per square inch. In the meantime the mold core 15 has been heated to the desired temperature by circulating a suitable heating fluid thru a series of ducts 17 in order to heat the surfaces thereof which contact with the coated interior surfaces of body 10. When the thickness of the bituminous lining 10 is about ¼ to ⅜ inch in thickness, a pressure of 300 pounds per square inch and a temperature of about 260° F. will be sufficient to slightly soften the premolded bituminous body 10 and cause it to be reshaped or remolded down upon the mold core 15, the interior coating 11 being thereby subjected also to the pressure of 300 pounds per square inch and to the temperature of the mold core 15. Under this pressure and temperature the nitrocellulose compound will first flow and form a smooth interior surface lining upon the bituminous body 10 and when the mold core 15 has been cooled somewhat and the coated body 10 removed therefrom the nitrocellulose material will form a very smooth, hard, enamel-like coating (indicated by 12 in Fig. 1), which will be firmly bonded to the bituminous material. The molded body 10 is stripped from the mold core 15 by the knock-out plate 30 which is forced upward by the knock-out pins 31 in a manner which will be clear to those skilled in the art. Of course, the air bag 20 is deflated before the mold cover 25 is raised to an out of the way position. The proper degree of slant or draft should be provided to the exterior walls of mold core 15 to facilitate separation of the molded body from the core, as will be well understood.

Figure 2:
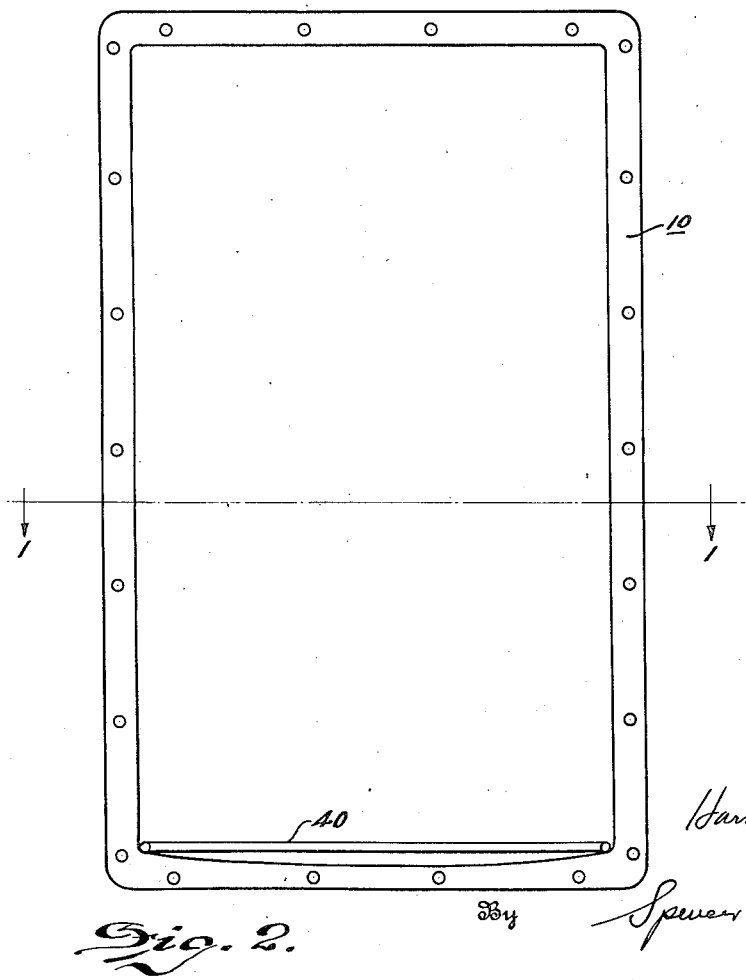
Fig. 2 is a front elevation of the cabinet lining of Fig. 1, looking toward the open side thereof and shows a wire grid resting upon the floor of the lining.

A refrigerator cabinet lining made in one piece according to this invention is absolutely moisture proof, non-corroding, of very fine appearance, and will last indefinitely since it will not rot, rust, or corrode on either its interior or exterior surface. The removable wire grating 40, shown in Fig. 2, rests at the edges upon the slightly concave floor of the cabinet lining and so protects food placed thereupon from any moisture which may collect at the bottom of the compartment. This cabinet lining may be used with any ordinary refrigerator cabinet construction and is to be substituted for the common enameled sheet metal lining or other known forms of lining.

While the form of embodiment of the present invention as herein disclosed, constitutes a preferred form, it is to be understood that other forms might be adopted, all coming within the scope of the claims which follow.

What is claimed is as follows:

1. The steps in the method of making a refrigerator cabinet lining comprising: premolding an open-front box-shaped lining to dimensions slightly larger than the desired final dimensions, applying a coating of an uncured moldable finishing material to the interior surface of said premolded lining, placing said coated lining over a corresponding mold core but having slightly smaller dimensions to permit easy insertion thereupon, and then applying molding pressure upon the outside of said box-shaped lining to reduce its dimensions and remold said premolded lining upon said mold core and to cure the interior coating of finishing material thereupon according to the dimensions of said mold core.

2. The steps in the method of making a refrigerator cabinet lining comprising: premolding an open-front box-shaped lining to dimensions slightly larger than the desired final dimensions, applying a coating of an uncured moldable finishing material to the interior surface of said premolded lining, telescoping said coated lining over a corresponding mold core of slightly smaller dimension, and then applying molding pressure upon the exterior of said premolded lining to reduce its dimensions and remold the same according to the dimensions of said mold core and simultaneously to mold the finish coating upon the interior surface thereof by contact with said mold core.

3. The steps in the method of making a refrigerator cabinet lining comprising: premolding an open-front box-shaped lining to dimensions slightly larger than the desired final dimensions, applying a coating of an uncured moldable finishing material to the interior surface of said premolded lining, telescoping said coated lining over a corresponding mold core having the desired final dimensions, and then applying molding pressure simultaneously to all the exterior sides of said box-shaped lining to reduce its dimensions and remold said lining down upon said core and to cure the finish coating upon the interior surface thereof.

4. The steps in the method of molding an open-sided box-shaped article comprising: premolding said article to slightly oversize dimensions in a suitable mold, then applying a coating of moldable finishing material upon the interior surface of said box-shaped article, telescoping said coated article over a corresponding mold core having the desired smaller final dimensions and then applying molding pressure to the exterior sides of said box-shaped article to reduce its dimensions and remold said article down upon said core and simultaneously bond and cure the coating of finishing material thereupon.

5. The steps in the method of molding an open-sided box-shaped article comprising: premolding said article to slightly oversize dimensions in a suitable mold, then applying a coating of moldable finishing material upon the interior surface of said box-shaped article, telescoping said coated article over a corresponding mold core having the desired smaller final dimensions, and then applying molding pressure simultaneously to all the exterior sides of said box-shaped article to reduce its dimensions and remold and reshape said article down upon said core and to cure the finish coating upon the interior surface thereof.

6. The steps in the method of molding an open-sided box-shaped article comprising: premolding said article to slightly oversize dimensions in a suitable mold, from a hot plastic bituminous compound applying a finish coating of uncured moldable nitrocellulose compound to the surface of said article, and then remolding said coated article in a final mold of slightly different dimensions from said premolded article whereby to mold and cure the finish coating thereupon.

7. The steps in the method of making a molded article having a molded finish coating thereupon comprising premolding said article from a hot plastic bituminous compound, coating said premolded article with a finish coating of a nitrocellulose compound moldable under heat and pressure, and then again molding said coated article in a suitable mold under heat and pressure sufficient to cure and bond said nitrocellulose compound coating firmly upon the bituminous body of said article.

In testimony whereof I hereto affix my signature.

HARVEY D. GEYER.